US012808411B2

(12) United States Patent
Shahin et al.

(10) Patent No.: US 12,808,411 B2
(45) Date of Patent: Nov. 24, 2026

(54) GUIDE PIN AND CALIPER BRAKE HAVING THE SAME

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE); Moritz Riemer, Waldems (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 502 days.

(21) Appl. No.: 18/233,158

(22) Filed: Aug. 11, 2023

(65) Prior Publication Data

US 2023/0383798 A1 Nov. 30, 2023

(30) Foreign Application Priority Data

Aug. 18, 2022 (KR) ........................ 10-2022-0103422

(51) Int. Cl.
*F16D 65/14* (2006.01)
*F16D 55/2265* (2006.01)
*F16D 65/00* (2006.01)

(52) U.S. Cl.
CPC ... *F16D 55/22655* (2013.01); *F16D 65/0087* (2013.01)

(58) Field of Classification Search
CPC ............. F16D 65/0087; F16D 55/2265; F16D 55/22655; F16D 55/227
See application file for complete search history.

(56) References Cited

U.S. PATENT DOCUMENTS 4,051,927 A * 10/1977 Karasudani ........ F16D 55/22655 188/73.44
6,026,938 A * 2/2000 Demoise, Jr. ..... F16D 55/22655 188/73.35
2008/0093181 A1* 4/2008 Waag ................ F16D 55/22655 188/73.44
2022/0186797 A1* 6/2022 Philpott .............. F16D 65/0087

FOREIGN PATENT DOCUMENTS

| | | |
|---|---|---|
| CN | 105134830 | 12/2015 |
| FR | 2899296 | 10/2007 |
| JP | 05-67830 | 9/1993 |
| JP | 06-173978 | 6/1994 |

(Continued)

OTHER PUBLICATIONS

German Patent and Trademark Office, German Patent Application No. 102023120378.9, Office Action dated May 15, 2024, 14 pages.

(Continued)

*Primary Examiner* — Nicholas J Lane
(74) *Attorney, Agent, or Firm* — WOMBLE BOND DICKINSON (US) LLP

(57) ABSTRACT

In accordance with one embodiment of the present disclosure, a guide pin allowing a caliper housing to be slidably coupled to a carrier during braking, includes a cylindrical guide shaft portion; and a head portion provided at one end of the guide shaft portion in an enlarged diameter form, and the guide shaft portion is provided in a form in which at least a portion of a center thereof is hollow in an axial direction to form a hollow portion.

12 Claims, 5 Drawing Sheets

(56) References Cited

FOREIGN PATENT DOCUMENTS

| | | | |
|---|---|---|---|
| JP | 06-178978 | | 6/1994 |
| JP | 2004-278638 | | 10/2004 |
| JP | 2007-085443 | | 4/2007 |
| JP | 2009-068593 | | 4/2009 |
| KR | 10-1998-0030669 | U | 8/1998 |
| KR | 10-1998-0085277 | | 12/1998 |
| KR | 10-0534245 | B1 | 3/2005 |
| KR | 10-2010-0023440 | | 3/2010 |
| KR | 10-2010-0043696 | | 4/2010 |
| KR | 10-2021-0082625 | | 7/2021 |

OTHER PUBLICATIONS

Korean Intellectual Property Office Application No. 10-2022-0103422, Office Action dated Oct. 1, 2025, 10 pages.

* cited by examiner

GUIDE PIN AND CALIPER BRAKE HAVING THE SAME

CROSS-REFERENCE TO RELATED APPLICATION

This application claims the benefit of Korean Patent Application No. 10-2022-0103422, filed on Aug. 18, 2022 in the Korean Intellectual Property Office, the disclosure of which is incorporated herein by reference.

BACKGROUND

1. Field

Embodiments of the present disclosure relate to a guide pin for a caliper brake and a caliper brake having the same, and more particularly, to a guide pin for a caliper brake capable of reducing noise and reducing weight during brake operation by including a hollow portion therein, and a caliper brake having the same.

2. Description of the Related Art

In general, a caliper brake may be provided to include a carrier in which a pair of pad plates are installed to move forward and backward to press a disk rotating together with a wheel of a vehicle, a caliper housing slidably installed on the carrier through a guide pin and provided with a cylinder in which a piston is installed to move forward and backward by braking hydraulic pressure, and the like.

Such a caliper brake performs a braking action as the piston presses an inner pad plate by hydraulic pressure during braking, and the caliper housing presses an outer pad plate toward the disk while sliding from the carrier by a reaction force against the pressing. Also, in addition, the caliper brake performs a parking braking action by employing an electrically operated actuator to press the piston with a spindle unit that receives a rotational force of a motor and converts a rotational motion into a linear motion.

Studies have been conducted to reduce brake noise generated during braking by such a brake. In order to reduce the noise, for example, methods of using new materials, improving brake pad designs to provide a chamfer in brake pads, and the like are known.

However, while these solutions are expensive, the solutions do not produce sufficiently satisfactory results, and therefore, a solution to further reduce brake noise in an inexpensive and effective manner is required.

SUMMARY

Therefore, it is an aspect of the present disclosure to provide a guide pin for a caliper brake capable of reducing noise and reducing weight during brake operation by including a hollow portion therein, and a caliper brake having the same.

Additional aspects of the disclosure will be set forth in part in the description which follows and, in part, will be obvious from the description, or may be learned by practice of the disclosure.

In accordance with one aspect of the present disclosure, a guide pin allowing a caliper housing to be slidably coupled to a carrier during braking, the guide pin includes a cylindrical guide shaft portion, and a head portion provided at one end of the guide shaft portion in an enlarged diameter form, and the guide shaft portion is provided in a form in which at least a portion of a center thereof is hollow in an axial direction to form a hollow portion.

The guide shaft portion may include two or more parts having different materials from each other.

The guide shaft portion may include a first base layer and a second base layer having a cylindrical shape and integrally formed with the head portion and an insertion material layer provided between the first base layer and the second base layer.

The guide shaft portion may include a base layer having a cylindrical shape and integrally formed with the head portion, a first insertion material layer provided on an outer circumferential surface of the base layer, and a second insertion material layer provided on an inner circumferential surface of the base layer.

The guide shaft portion may include a base layer having a cylindrical shape and integrally formed with the head portion and one or more insertion materials inserted into the base layer.

The insertion materials may include two or more insertion materials inserted to be spaced apart from each other in an axial direction of the base layer.

The insertion materials may include two or more insertion materials inserted to be spaced apart from each other in a circumferential direction of the base layer.

The guide shaft portion may be provided with a heat insulating material layer on an outer circumferential surface thereof.

The guide shaft portion may be provided with a low-friction material layer on an outer circumferential surface thereof.

The low-friction material layer may be provided with two or more cylindrical layers spaced apart from each other on the outer circumferential surface of the guide shaft portion.

In accordance with another embodiment of the present disclosure, a caliper brake includes a carrier fixed to a vehicle body, a caliper housing installed in the carrier to be movable forward and backward, and a guide pin having one end fixed to the caliper housing and the other end slidably coupled to a guide hole provided in the carrier to slidably couple the caliper housing to the carrier, the guide pin include a cylindrical guide shaft portion and a head portion provided at one end of the guide shaft portion in an enlarged diameter form, and the guide shaft portion is provided in a form in which at least a portion of a center thereof is hollow in an axial direction to form a hollow portion.

The guide shaft portion may include two parts having different materials from each other.

The guide shaft portion may include a first base layer and a second base layer having a cylindrical shape and integrally formed with the head portion and an insertion material layer provided between the first base layer and the second base layer.

The guide shaft portion may include a base layer having a cylindrical shape and integrally formed with the head portion, a first insertion material layer provided on an outer circumferential surface of the base layer, and a second insertion material layer provided on an inner circumferential surface of the base layer.

The guide shaft portion may include a base layer having a cylindrical shape and integrally formed with the head portion and one or more insertion materials inserted into the base layer.

The insertion materials may include two or more insertion materials inserted to be spaced apart from each other in an axial direction of the base layer.

The insertion materials may include two or more insertion materials inserted to be spaced apart from each other in a circumferential direction of the base layer.

The guide shaft portion may be provided with a heat insulating material layer on an outer circumferential surface thereof.

The guide shaft portion may be provided with a low-friction material layer on an outer circumferential surface thereof.

The low-friction material layer may be provided with two or more cylindrical layers spaced apart from each other on the outer circumferential surface of the guide shaft portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
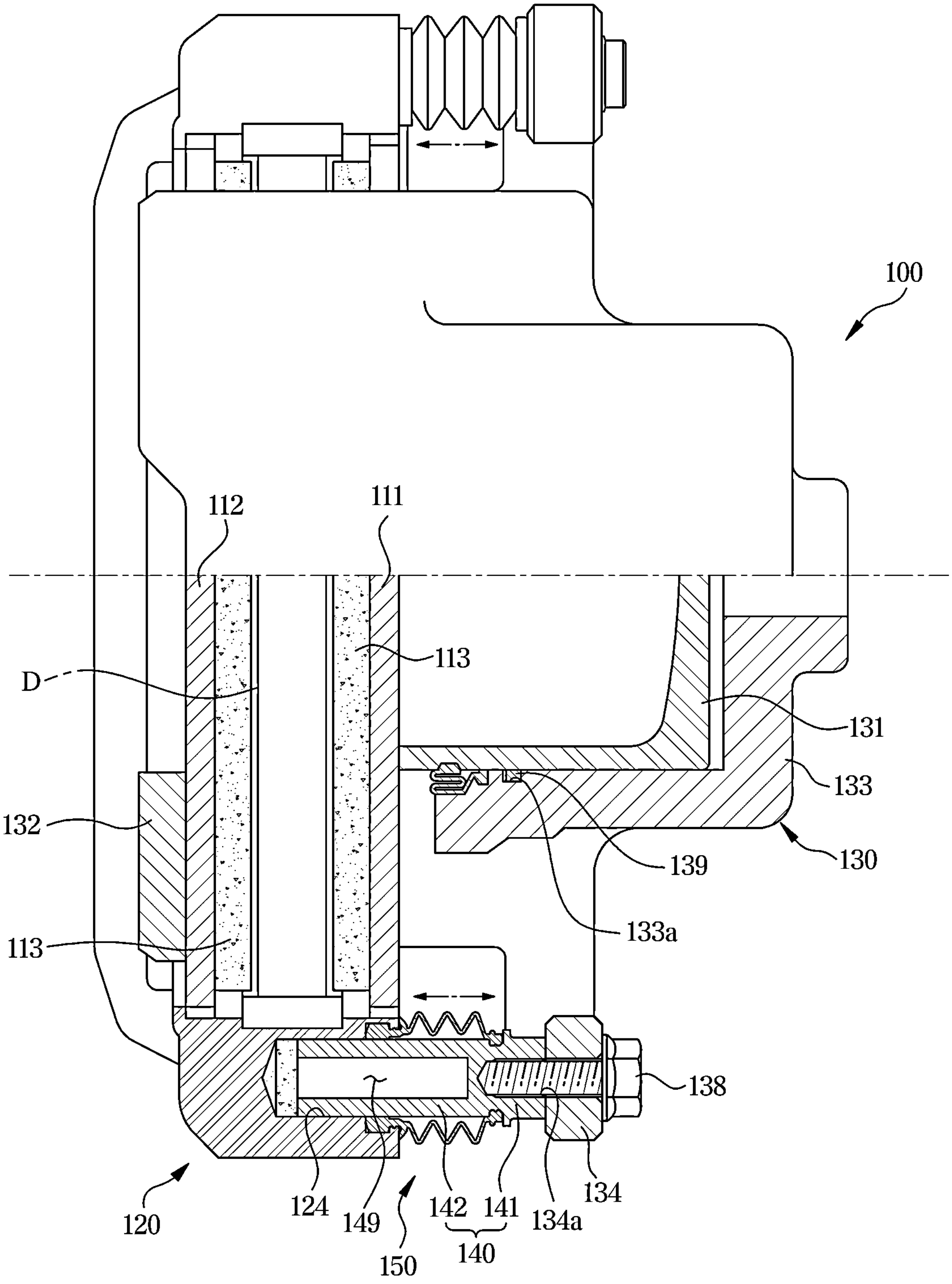
FIG. 1 is a cross-sectional view illustrating a caliper brake in accordance with one embodiment of the present disclosure.

Like reference numerals refer to like elements throughout the specification. Not all elements of embodiments will be described in the specification, and general information in the technical field to which the present disclosure pertains or overlapping information between the embodiments will be omitted. The terms “part,” “module,” “member,” or “block” as used throughout the specification may be implemented in software or hardware, and a plurality of “parts,” “modules,” “members,” or “blocks” may be implemented in a single component, or a single “part,” “module,” “member,” or “block” may include a plurality of components.

It will be understood that when a component is referred to as being “connected” to another component throughout the specification, it can be directly or indirectly connected to the other component. When a component is indirectly connected to another component, it may be connected to the other component through a wireless communication network.

In addition, when a part “includes” or “comprises” a component, unless described to the contrary, the term “includes” or “comprises” does not indicate that the part excludes another component but instead indicates that the part may further include the other component.

Terms such as first, second, etc., are used to distinguish one component from another component, and the components are not limited by the above-described terms.

Unless the context clearly indicates otherwise, the singular forms include the plural forms.

In each operation, identification codes are used for convenience of description but are not intended to illustrate the order of the operations, and each operation may be implemented in an order different from the illustrated order unless explicitly stated in the context.

Hereinafter, a working principle and embodiments of the present disclosure will be described with reference to the accompanying drawings.

Figure 2:
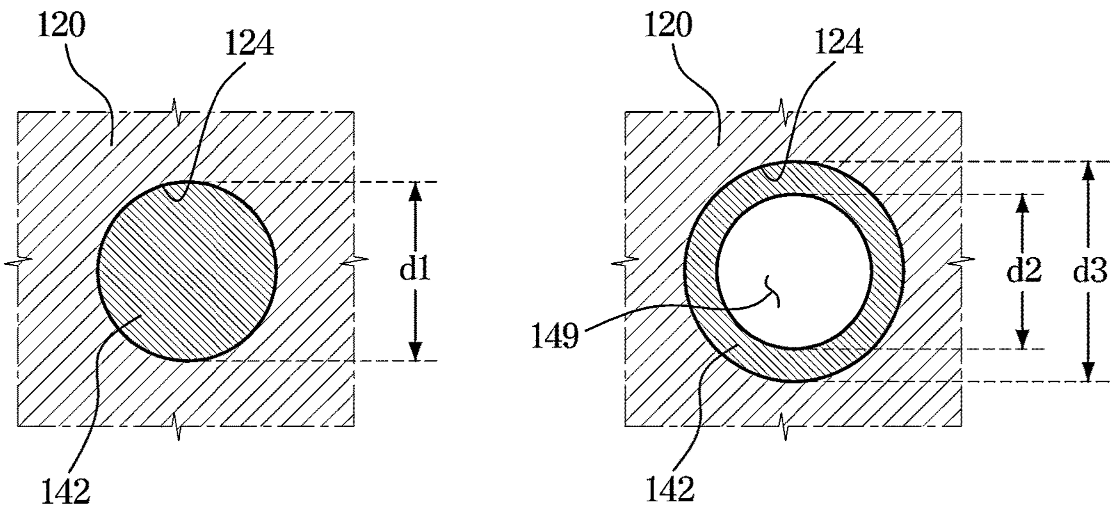
FIG. 2 is a cross-sectional view illustrating a guide pin in accordance with one embodiment of the present disclosure.

FIG. 1 is a cross-sectional view illustrating a caliper brake in accordance with one embodiment of the present disclosure, and FIG. 2 is a cross-sectional view illustrating a guide pin in accordance with one embodiment of the present disclosure.

Referring to FIGS. 1 and 2, a caliper brake 100 in accordance with one embodiment of the present disclosure includes a pair of pad plates 111 and 112 to which friction pads 113 are attached to press both sides of a disk D rotating together with a wheel (not illustrated), a carrier 120 in which the pair of pad plates 111 and 112 are spaced apart from each other at a certain interval to be movable forward to and backward from the disk D, a caliper housing 130 installed in the carrier 120 to move forward and backward to press the pair of pad plates 111 and 112 onto the disk D, a guide pin 140 having one end fixed to the caliper housing 130 and the other end slidably coupled to a guide hole 124 provided in the carrier 120 to slidably couple the caliper housing 130 to the carrier 120, and a boot 150 mounted on the guide pin 140 and the carrier 120 to prevent foreign substances from entering the guide hole 124.

Each of the pair of pad plates 111 and 112 is provided with a friction pad 113 attached to its inner surface. The pair of pad plates 111 and 112 are composed of an inner pad plate 111 disposed in contact with a piston 131 and an outer pad plate 112 disposed in contact with a finger portion 132 of the caliper housing 130 to be described below, and are installed to be slidably movable on the carrier 120. That is, the pair of pad plates 111 and 112 are installed on the carrier 120 fixed to a vehicle body and move forward to and backward from both side surfaces of the disk D to perform braking operation.

The carrier 120 is coupled and fixed to a knuckle (not illustrated) of the vehicle body to be positioned on one side of an outer circumference of the disk D. The guide holes 124 are formed on both sides of an upper portion of the carrier 120. In addition, a fastening groove 125 is provided at an open entrance of the guide hole 124 so that the boot 150 to be described below is coupled thereto.

The caliper housing 130 includes a cylinder 133 in which the piston 131 for pressurizing the inner pad plate 111 is installed to move forward and backward and the finger portion 132 for pressurizing the outer pad plate 112.

The piston 131 is installed in the cylinder 133 to move forward and backward. When braking hydraulic pressure is applied to the cylinder 133, the piston 131 presses the inner pad plate 111 while moving forward, the caliper housing 130 slides from the carrier 120 together with the guide pin 140 by a reaction force of the pressing, and the finger portion 132 presses the outer pad plate 112 toward the disk D. Accordingly, as the pair of pad plates 111 and 112 compress the disk D, a braking force is generated.

Meanwhile, a seal member 139 is provided between the cylinder 133 and the piston 131 and is installed in a seal groove 133*a* formed in the cylinder 133. That is, the seal member 139 serves to return the piston 131 to its original position when braking is released, as well as performing a function of sealing between an inner surface of the cylinder 133 and an outer surface of the piston 131 to prevent leakage of a braking fluid.

The guide pin 140 includes a cylindrical guide shaft portion 142 and a head portion 141 provided at one end of the guide shaft portion 142 in an enlarged diameter form.

A threaded screw groove is formed in the head portion 141 to allow a fixing bolt 138 to be coupled, and an engaging groove recessed to a predetermined depth is provided on an outer circumferential surface of the head portion 141.

The guide pin 140 is inserted and coupled such that the guide shaft portion 142 is slidable into the guide hole 124 of the carrier 120, and the head portion 141 is securely fixed to the caliper housing 130 by screw-coupling the fixing bolt 138 to the screw groove of the head portion 141 through a coupling hole 134*a* of the caliper housing 130, so that the carrier 120 and the caliper housing 130 are coupled to be mutually movable.

The boot 150 is provided to surround the outside of the guide pin 140 to prevent inflow of foreign substances into the guide hole 124.

Meanwhile, in one embodiment of the present disclosure, the guide shaft portion 142 is provided in a form in which at least a portion of the center thereof is hollow in an axial direction to form a hollow portion 149. Since the guide shaft portion 142 inserted into and coupled to the guide hole 124 of the carrier 120 includes the hollow portion 149 at the center in this way, noise generated during braking of the caliper brake 100 may be dissipated or disturbed and thus be reduced.

FIG. 2 illustrates a cross section (left side) of the guide shaft portion 142 of the guide pin 140 without the hollow portion 149 and a cross section (right side) of the guide shaft portion 142 of the guide pin 140 with the hollow portion 149.

Referring to FIG. 2, a diameter d3 of the guide pin 140 with the hollow portion 149 in accordance with the embodiment of the present disclosure may be made larger than a diameter d1 of the guide pin 140 without the hollow portion 149. In this case, the guide pin 140 with the hollow portion 149 may be reduced in weight as a diameter d2 of the hollow portion 149 increases.

Further, by properly adjusting the diameter d3 of the guide pin 140 and the diameter d2 of the hollow portion 149, the bending and shear stiffness may not be reduced as compared to the guide pin 140 without the hollow portion 149.

In addition, when the diameter of the guide pin 140 increases in this way, the diameter of the guide hole 124 into which the guide pin 140 is inserted also increases. Accordingly, the weight of the carrier 120 in which the guide hole 124 is provided is also reduced, and as a result, the weight of the caliper brake 100 is reduced.

Meanwhile, in one embodiment of the present disclosure, the guide shaft portion 142 may include two or more parts having different materials from each other. Since the guide shaft portion 142 is formed by combining two or more parts having different materials from each other as mentioned above, noise reduction using the hollow portion 149 may be achieved more efficiently.

In one embodiment of the present disclosure, the guide shaft portion 142 may be provided in such a way that an insertion material is coupled to a base integrally formed with the head portion 410.

Figure 3:
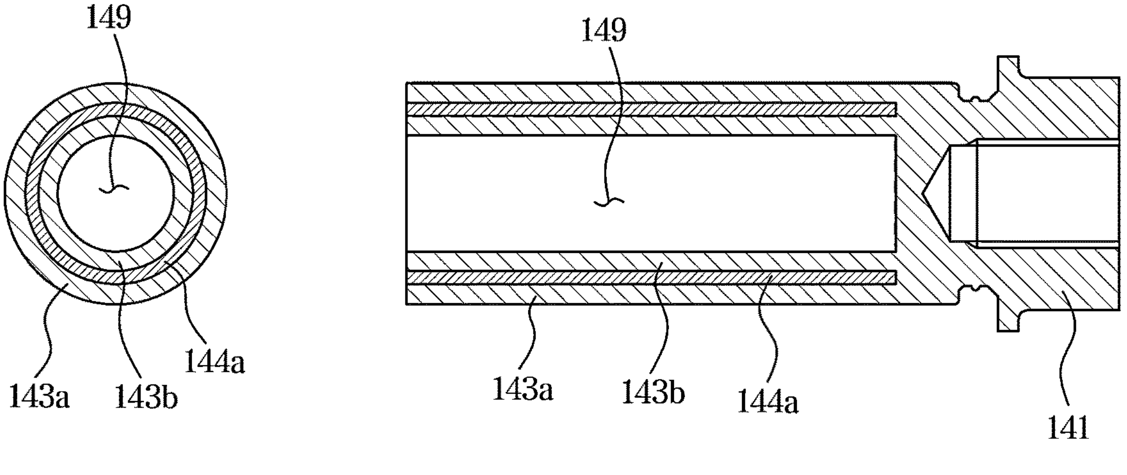
FIGS. 3 to 5 are views illustrating guide pins including insertion materials in accordance with various embodiments of the present disclosure.
Figure 4:
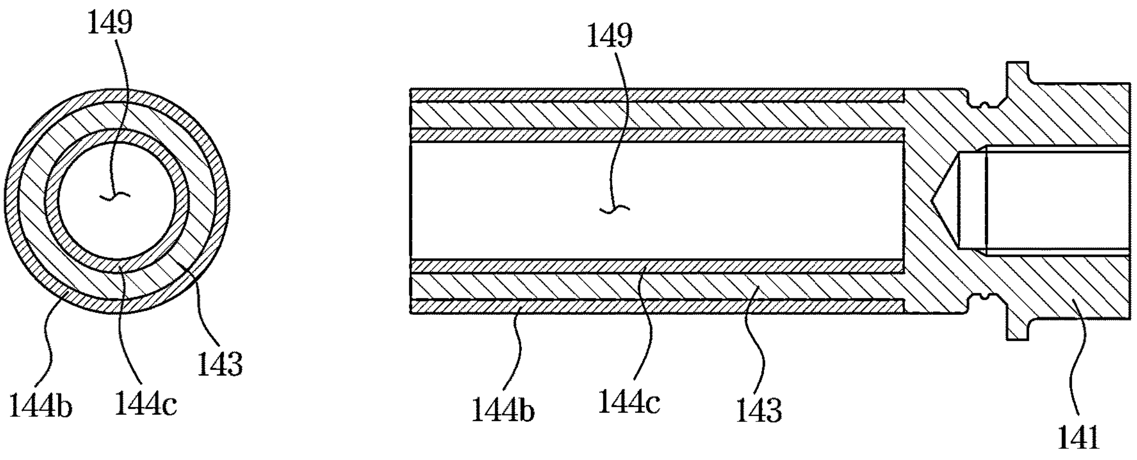
Figure 5:
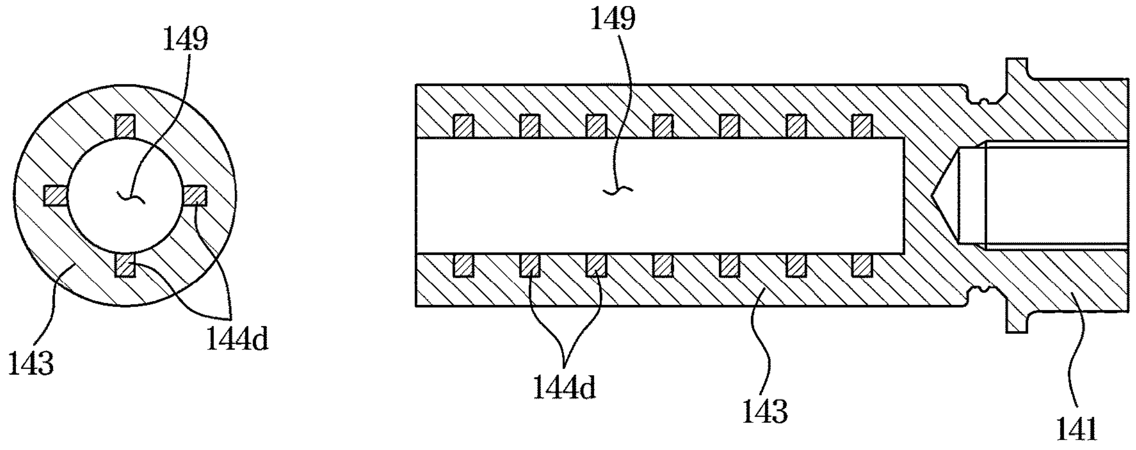

FIGS. 3 to 5 are views illustrating guide pins including insertion materials in accordance with various embodiments of the present disclosure.

FIGS. 3 and 4 are cross-sectional views of the guide pin 140 including the insertion materials in accordance with the embodiments of the present disclosure in the form of a layer.

Referring to FIG. 3, in one embodiment of the present disclosure, the guide shaft portion 142 may include a first base layer 143*a* and a second base layer 143*b* having a cylindrical shape and integrally formed with the head portion 141, and an insertion material layer 144*a* provided between the first base layer 143*a* and the second base layer 143*b*. In this way, the insertion material layer 144*a* in which an insertion material is formed in a layer form may be provided between the first base layer 143*a* and the second base layer 143*b* integrally formed with the head portion 141 to form a layered structure. In this case, the insertion material forming the insertion material layer 144*a* may include a material different from that of the base layers 143*a* and 143*b*.

Preferably, the first base layer 143*a* and the second base layer 143*b* integrally formed with the head portion 141 may include a metal material, and the insertion material layer 144*a* may include a plastic material.

On the other hand, referring to FIG. 4, in one embodiment of the present disclosure, the guide shaft portion 142 may include a base layer 143 having a cylindrical shape and integrally formed with the head portion 141, a first insertion material layer 144*b* provided on an outer circumferential surface of the base layer 143, and a second insertion material layer 144*c* provided on an inner circumferential surface of the base layer 143. In this way, the first insertion material layer 144*b* and the second insertion material layer 144*c* may be provided on the outer and inner circumferential surfaces of the base layer 143 integrally formed with the head portion 141, respectively, to form a layered structure. In this case, the insertion materials forming the insertion material layers 144*b* and 144*c* may include a material different from that of the base layers 143.

Preferably, the base layer 143 integrally formed with the head portion 141 may include a metal material, and the first insertion material layer 144*b* and the second insertion material layer 144*c* may include a plastic material.

In another embodiment of the present disclosure, insertion materials may have a form inserted into the base layer. FIG. 5 is a set of cross-sectional views of the guide pin 140 in which insertion materials are inserted into the base layer.

Referring to FIG. 5, in one embodiment of the present disclosure, the guide shaft portion 142 may include a base layer 143 having a cylindrical shape and integrally formed with the head portion, and one or more insertion materials 144*d* inserted into the base layer 143. In the embodiment illustrated in FIG. 5, the one or more insertion materials 144*d* are inserted into an inner circumferential surface of the base layer 143 to be partially exposed. In this case, the insertion materials 144*d* may include a material different from that of the base layer 143.

Preferably, the base layer 143 integrally formed with the head portion 141 may include a metal material, and the insertion materials 144*d* may include a plastic material.

In one embodiment of the present disclosure, the insertion materials 144*d* may include two or more insertion materials 144*d* inserted to be spaced apart from each other in an axial direction of the base layer 143. As illustrated on the right side of FIG. 5, the insertion materials 144*d* may include a plurality of insertion materials 144*d* inserted to be spaced apart from each other in the axial direction of the base layer 143. FIG. 5 illustrates an embodiment in which seven pairs of insertion materials 144*d* spaced apart from each other in the axial direction are included.

Meanwhile, in one embodiment of the present disclosure, the insertion materials 144*d* may include two or more insertion materials 144*d* inserted to be spaced apart from each other in a circumferential direction of the base layer 143. As illustrated on the left side of FIG. 5, the insertion materials **144*d* may include a plurality of insertion materials 144*d* inserted to be spaced apart from each other in the circumferential direction of the base layer 143. FIG. 5 illustrates an embodiment in which four pairs of insertion materials 144*d*** spaced apart from each other in the circumferential direction thereof are included.

Meanwhile, in one embodiment of the present disclosure, the insertion materials **144*d* may include two or more insertion materials 144*d* inserted to be spaced apart from each other in both the axial direction and the circumferential direction of the base layer 143. That is, the insertion materials 144*d* may be spaced apart from each other in both the axial direction and the circumferential direction of the base layer 143. In the embodiment illustrated in FIG. 5, seven pairs of insertion materials 144*d* are provided in the axial direction of the base layer 143, and each of the pairs of insertion materials 144*d* spaced apart in the axial direction includes four insertion materials 144*d* spaced apart in the circumferential direction, and thus a total of twenty-eight insertion materials 144*d* are inserted into the base layer 143**.

In the embodiments of the present disclosure as described above, vibration characteristics (frequency, elasticity, and damping) of the guide shaft portion 142 may be adjusted by the insertion materials coupled by forming a layered-structure with the base layer of the guide shaft portion 142 or inserted into the base layer, and noise generated during braking may be reduced through such vibration characteristics.

Figure 6:
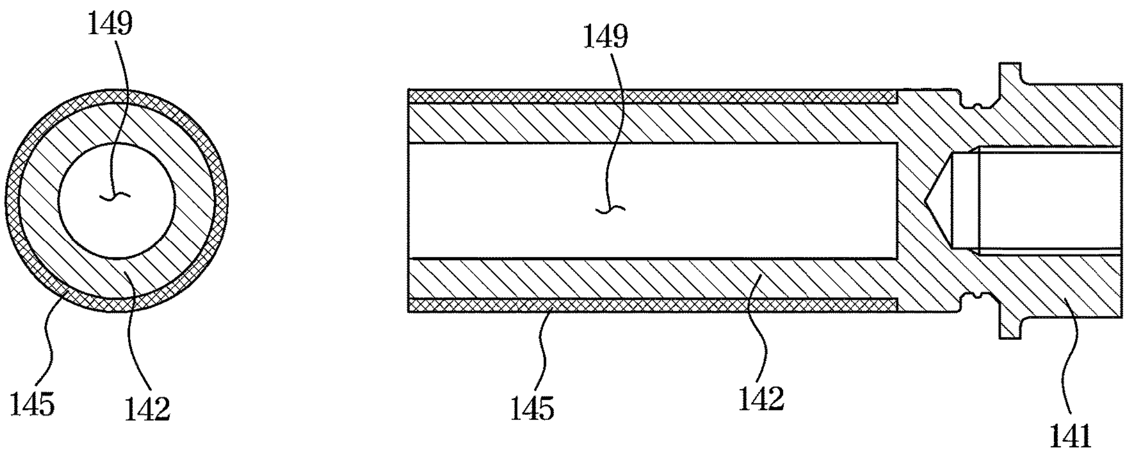
FIG. 6 is a view illustrating a guide pin including a heat insulating material layer in accordance with one embodiment of the present disclosure.

FIG. 6 is a view illustrating a guide pin including a heat insulating material layer in accordance with one embodiment of the present disclosure.

Referring to FIG. 6, in one embodiment of the present disclosure, the guide shaft portion 142 may have a heat insulating material layer 145 provided on an outer circumferential surface thereof.

The outer circumferential surface of the guide shaft portion 142 contacts an inner circumferential surface of the guide hole 124 into which the guide shaft portion 142 is inserted.

In one embodiment of the present disclosure, the heat insulating material layer 145 is provided on the outer circumferential surface of the guide shaft portion 142 to block transfer of heat generated during the braking operation of the caliper brake 100 between the guide pin 140 and the carrier 120. The thermal characteristics of the caliper brake 100 may be improved by the heat insulating material layer 145 as described above.

Figure 7:
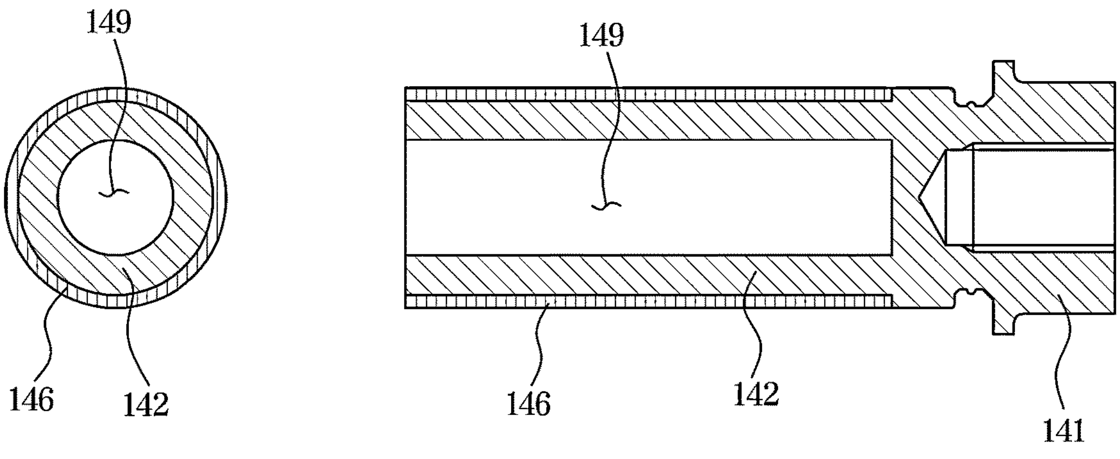
FIGS. 7 and 8 are views illustrating guide pins including low-friction material layers in accordance with various embodiments of the present disclosure.
Figure 8:
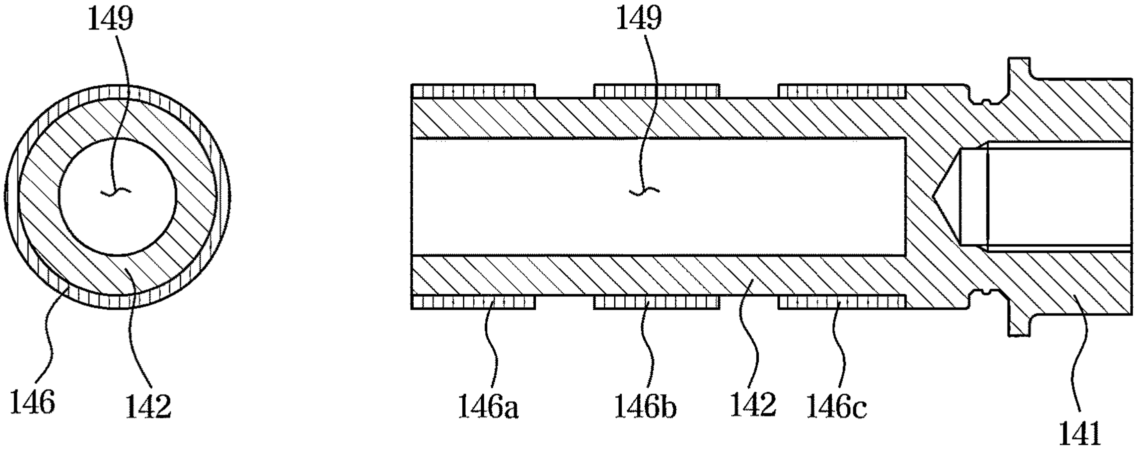

FIGS. 7 and 8 are views illustrating guide pins including low-friction material layers in accordance with various embodiments of the present disclosure.

Referring to FIG. 7, in one embodiment of the present disclosure, the guide shaft portion 142 may have a low-friction material layer 146 provided on the outer circumferential surface thereof.

The outer circumferential surface of the guide shaft portion 142 contacts the inner circumferential surface of the guide hole 124 into which the guide shaft portion 142 is inserted. Therefore, friction occurs between the guide shaft portion 142 and the guide hole 124 during the braking operation of the caliper brake 100.

In one embodiment of the present disclosure, the low-friction material layer 146 is provided on the outer circumferential surface of the guide shaft portion 142 to reduce friction between the guide pin 140 and the guide hole 124 during the braking operation of the caliper brake 100. Due to the low-friction material layer 146 as described above, it is possible to improve the efficiency of the caliper brake 100 and reduce noise generated by friction.

In one embodiment of the present disclosure, the low-friction material layer 146 may be provided with a material having a lower friction coefficient than a friction coefficient of the material constituting the guide shaft portion 142. That is, the guide shaft portion 142 and the low-friction material layer 146 may have different materials from each other.

In one embodiment of the present disclosure, the low-friction material layer 146 may be provided with a plastic material.

In one embodiment of the present disclosure, the low-friction material layer 146 may be provided with a metal material.

Meanwhile, in one embodiment of the present disclosure as illustrated in FIG. 8, the low-friction material layer 146 may be provided with two or more cylindrical layers spaced apart from each other on the outer circumferential surface of the guide shaft portion 142. FIG. 8 illustrates the low-friction material layer 146 provided with three cylindrical layers **146*a*, 146*b*, and 146*c* spaced apart from each other in the axial direction on the outer circumferential surface of the guide shaft portion 142**.

That is, the low-friction material layer 146 may be formed with one integrally formed layer as illustrated in FIG. 7 or may be provided with two or more layers spaced apart from each other as illustrated in FIG. 8.

As is apparent from the above description, in a guide pin for a caliper brake in accordance with one embodiment of the present disclosure and a caliper brake having the same, noise can be reduced by dissipation or disturbance by including a hollow portion.

In a guide pin for a caliper brake in accordance with one embodiment of the present disclosure and a caliper brake having the same, rigidity can be maintained or improved by increasing the diameter of the guide pin even if a hollow portion is included.

In a guide pin for a caliper brake in accordance with one embodiment of the present disclosure and a caliper brake having the same, a weight of a carrier can be reduced, and costs can be reduced by increasing a guide hole of a caliper as the diameter of the guide pin increases.

As above, the disclosed exemplary embodiments have been described with reference to the accompanying drawings. It will be understood by those skilled in the art that various changes in form and details may be made therein without departing from the spirit and scope of the disclosure as defined by the appended claims and their equivalents. The disclosed embodiments are illustrative and should not be construed as limiting.

What is claimed is:

1. A guide pin for a caliper brake allowing a caliper housing to be slidably coupled to a carrier during braking, the guide pin comprising:

a cylindrical guide shaft portion; and a head portion provided at one end of the cylindrical guide shaft portion in an enlarged diameter form, wherein the cylindrical guide shaft portion is provided in a form in which at least a portion of a center thereof is hollow in an axial direction to form a hollow portion, wherein the cylindrical guide shaft portion includes three cylindrical layers comprising at least one base layer and at least one insertion material layer, wherein the at least one base layer is integrally formed with the head portion, and wherein the at least one base layer and the at least one insertion material layer are alternately arranged in a radial direction.

2. The guide pin according to claim 1.

wherein the at least one base layer consists of a first base layer and a second base layer integrally formed with the head portion, and wherein the at least one insertion material layer consists of an insertion material layer provided between the first base layer and the second base layer.

3. The guide pin according to claim 1, wherein the at least one base layer consists of a base layer integrally formed with the head portion, and wherein the at least one insertion material layer consists of a first insertion material layer provided on an outer circumferential surface of the base layer, and a second insertion material layer provided on an inner circumferential surface of the base layer.

4. The guide pin according to claim 1, wherein the cylindrical guide shaft portion is provided with a heat insulating material layer on an outer circumferential surface thereof.

5. The guide pin according to claim 1, wherein the cylindrical guide shaft portion is provided with a low-friction material layer on an outer circumferential surface thereof.

6. The guide pin according to claim 5, wherein the low-friction material layer is provided with two or more cylindrical layers spaced apart from each other on the outer circumferential surface of the cylindrical guide shaft portion.

7. A caliper brake comprising:

a carrier fixed to a vehicle body;

a caliper housing installed in the carrier to be movable forward and backward; and a guide pin having a first end fixed to the caliper housing and a second end slidably coupled to a guide hole provided in the carrier to slidably couple the caliper housing to the carrier, wherein the guide pin includes:

a cylindrical guide shaft portion; and a head portion provided at one end of the cylindrical guide shaft portion in an enlarged diameter form, and the cylindrical guide shaft portion is provided in a form in which at least a portion of a center thereof is hollow in an axial direction to form a hollow portion, wherein the cylindrical guide shaft portion includes three cylindrical layers comprising at least one base layer and at least one insertion material layer, wherein the at least one base layer is integrally formed with the head portion, and wherein the at least one base layer and the at least one insertion material layer are alternately arranged in a radial direction.

8. The caliper brake according to claim 7, wherein the at least one base layer consists of a first base layer and a second base layer integrally formed with the head portion, and wherein the at least one insertion material layer consists of an insertion material layer provided between the first base layer and the second base layer.

9. The caliper brake according to claim 7, wherein the at least one base layer consists of a base layer integrally formed with the head portion, and wherein the at least one insertion material layer consists of a first insertion material layer provided on an outer circumferential surface of the base layer, and a second insertion material layer provided on an inner circumferential surface of the base layer.

10. The caliper brake according to claim 7, wherein the cylindrical guide shaft portion is provided with a heat insulating material layer on an outer circumferential surface thereof.

11. The caliper brake according to claim 7, wherein the cylindrical guide shaft portion is provided with a low-friction material layer on an outer circumferential surface thereof.

12. The caliper brake according to claim 11, wherein the low-friction material layer is provided with two or more cylindrical layers spaced apart from each other on the outer circumferential surface of the cylindrical guide shaft portion.

* * * * *